United States Patent
Rahman et al.

(10) Patent No.: US 8,095,651 B2
(45) Date of Patent: Jan. 10, 2012

(54) DELAYABLE EVENTS IN HOME NETWORK

(75) Inventors: Mahfuzur Rahman, Santa Clara, CA (US); Jian Huang, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 286 days.

(21) Appl. No.: 12/271,570

(22) Filed: Nov. 14, 2008

(65) Prior Publication Data

US 2010/0034104 A1  Feb. 11, 2010

Related U.S. Application Data

(60) Provisional application No. 61/087,012, filed on Aug. 7, 2008.

(51) Int. Cl.
*G06F 15/173* (2006.01)

(52) U.S. Cl. ........................................... 709/224

(58) Field of Classification Search .......... 709/223–224; 370/252
See application file for complete search history.

(56) References Cited

U.S. PATENT DOCUMENTS 7,533,158 B2 * 5/2009 Grannan et al. .............. 709/219
2005/0184852 A1 * 8/2005 Lee ................................ 340/3.1
2007/0086341 A1 * 4/2007 Ye ................................ 370/230
2007/0255856 A1 * 11/2007 Reckamp et al. ............. 709/250
2008/0112419 A1 * 5/2008 Lee et al. ...................... 370/401
2008/0165789 A1 * 7/2008 Ansari et al. ................. 370/401
2008/0192820 A1 * 8/2008 Brooks et al. ............ 375/240.02
2009/0070387 A1 * 3/2009 Bouse et al. .................. 707/200
2009/0100492 A1 * 4/2009 Hicks et al. ................... 725/127
2009/0300158 A1 * 12/2009 Bobde et al. ................. 709/223
2009/0304019 A1 * 12/2009 Chan ............................. 370/432
2010/0009662 A1 * 1/2010 Khosravy et al. .......... 455/414.1

OTHER PUBLICATIONS

UPnP Forum, UPnP Device Architecture 1.0, Apr. 24, 2008, pp. 1-77.

* cited by examiner

*Primary Examiner* — Faruk Hamza
*Assistant Examiner* — Jason Recek
(74) *Attorney, Agent, or Firm* — Beyer Law Group LLP

(57) ABSTRACT

In one embodiment, a method for monitoring events in a home network is provided. A node receives a subscription request from a control point, wherein the subscription request indicates an interest in delayable eventing. A change is detected in an event variable. It is then determined if the control point can receive an event sent from the node. If the control point cannot receive an event sent from the node, an event notification regarding the change in the event variable is stored such that the event notification can be retrieved when the control point can receive communications from the node.

17 Claims, 3 Drawing Sheets

DELAYABLE EVENTS IN HOME NETWORK

CROSS-RELATION TO RELATED APPLICATION

This application claims priority to provisional patent application Ser. No. 61/087,012, entitled "ENABLING DELAYABLE EVENT IN UNIVERSAL PLUG AND PLAY (UPnP) NETWORK", filed Aug. 7, 2008, herein incorporated by reference in its entirety.

BACKGROUND OF THE INVENTION

1. Field of the Invention

The present invention relates to computing. More particularly, the present invention relates to delayable events in a home network.

2. Description of the Related Art

Universal Plug and Play (UPnP) is a distributed, open networking architecture that allows devices to connect seamlessly and to simplify the implementation of networks in the home (data sharing, communications, and entertainment) and corporate environments. UPnP achieves this by defining and publishing UPnP device control protocols built upon open, Internet-based communication standards.

UPnP has grown in popularity of late in part due to the rise in popularity of media servers. Media servers are small computers that store multiple types of content (e.g., photos, music, videos, etc.). The content may then be streamed from a media server to one or more control points (e.g., iPod, television set, etc.).

As an example, a "Media Server" device might contain a significant portion of the homeowner's audio, video, and still-image library. In order for the homeowner to enjoy this content, the homeowner must be able to browse the objects stored on the Media Server, select a specific one, and cause it to be "played" on an appropriate rendering device.

For maximum convenience, it is highly desirable to allow the homeowner to initiate these operations from a variety of User Interface (UI) devices. In most cases, these UI devices will either be a UI built into the rendering device, or a stand-alone UI device such as a wireless PDA or tablet. In other cases, the home network user interface device could be more remote and communicate with the home network through a tunneling mechanism on the Internet.

Currently, UPnP clients ("control points") may subscribe to event messages from a UPnP service. When an event occurs in the service, such as the addition or deletion of a file, service errors, etc., the subscribing control points receive event messages notifying them of the event. Each event reflects a change in some state variable being monitored by the service.

The drawback of this approach is that the service can only send events to control points that are connected to the network at the time the event is detected. The event publisher discards the event message if the subscriber doesn't respond for 30 seconds after the event transmission. If a control point is disconnected, or is in sleep mode, the control point never receives the event message.

SUMMARY OF THE INVENTION

In one embodiment, a method for monitoring events in a home network is provided. A node receives a subscription request from a control point, wherein the subscription request indicates an interest in delayable eventing. A change is detected in an event variable. It is then determined if the control point can receive an event sent from the node. If the control point cannot receive an event sent from the node, an event notification regarding the change in the event variable is stored such that the event notification can be retrieved when the control point can receive communications from the node.

In another embodiment, a system for monitoring events in a home network is provided, the system comprising: one or more control points; and a node configured to: receive, at a node, a subscription request from a control point, wherein the subscription request indicates an interest in delayable eventing; detect a change in an event variable; determine if the control point can receive an event sent by the node; and if the control point cannot receive the event sent by the node, store an event notification regarding the change in the event variable such that the event notification can be retrieved when the control point can receive communications from the node.

In another embodiment, an apparatus for monitoring events in a home network is provided, the apparatus comprising: means for receiving, at a node, a subscription request from a control point, wherein the subscription request indicates an interest in delayable eventing; means for detecting a change in an event variable; means for determining if the control point can receive an event sent by the node; and means for, if the control point cannot receive the event sent by the node, storing an event notification regarding the change in the event variable such that the event notification can be retrieved when the control point can receive communications from the node.

In another embodiment, a program storage device readable by a machine tangibly embodying a program of instructions executable by the machine to perform a method for monitoring events in a home network is provided, the method comprising: receiving, at a node, a subscription request from a control point, wherein the subscription request indicates an interest in delayable eventing; detecting a change in an event variable; determining if the control point can receive an event sent by the node; and if the control point cannot receive the event sent by the node, storing an event notification regarding the change in the event variable such that the event notification can be retrieved when the control point can receive communications from the node.

DETAILED DESCRIPTION OF SPECIFIC EMBODIMENTS

Figure 1:
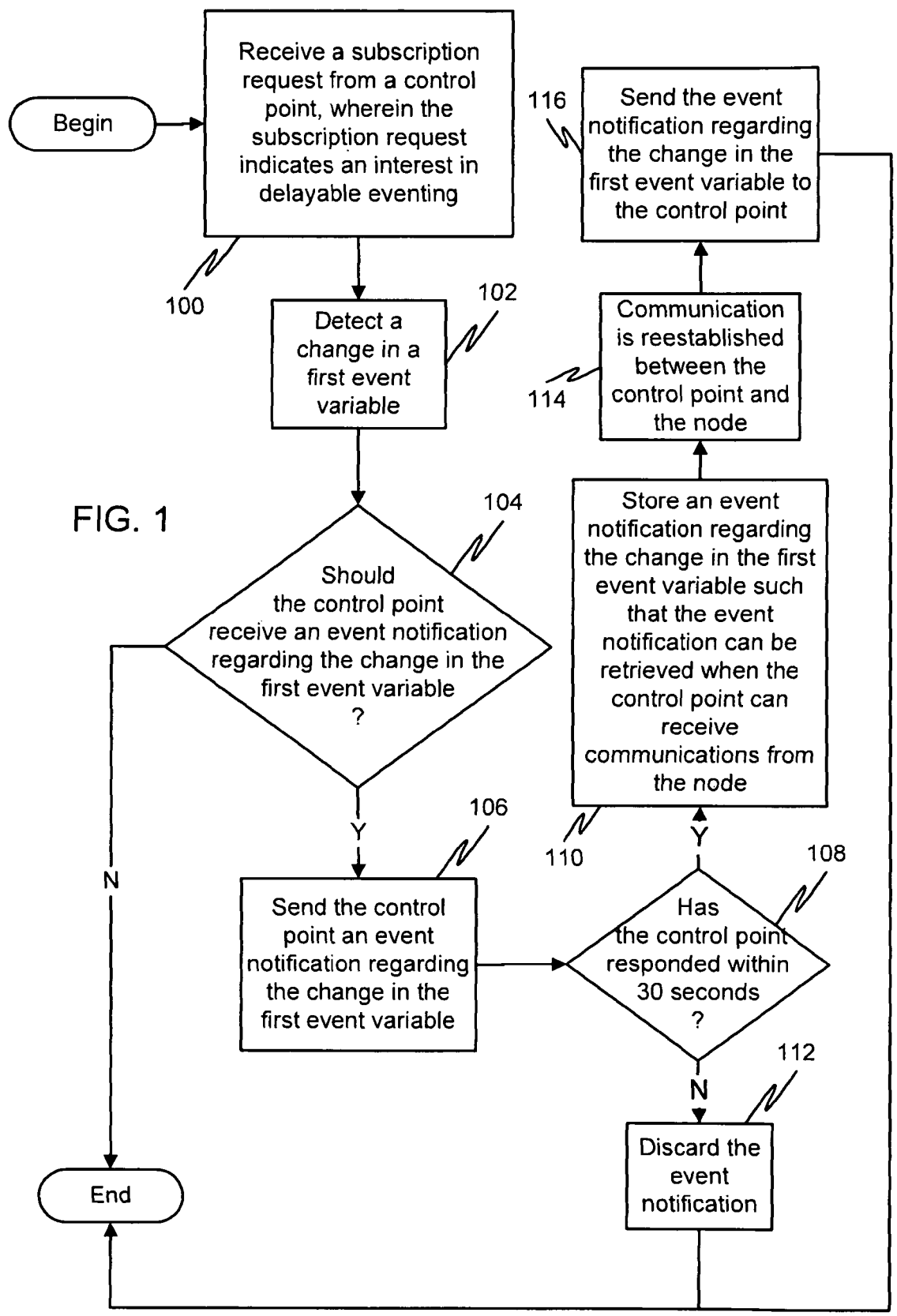
FIG. 1 is a flow diagram illustrating a method for monitoring events in a home network in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

It should be noted that the term "home networking" as used throughout this document refers to a type of network that is commonly used in homes to connect media devices. There is no requirement, however, that this type of networking actually be used in homes, as it has equal applicability for use in businesses or other entities. As such, the term "home networking" shall not be construed as limiting any embodiments of the present invention to use in a home, and shall be interpreted as any type of local area network (LAN).

For purposes of this document, the term "control point" shall be interpreted to mean any client device in a home network. A "traffic specification" shall be interpreted to mean any indication of an application's requirements, preferences, or expectations regarding network traffic it plans on receiving and/or sending.

In an embodiment of the present invention, a mechanism is provided that allows a home network event publisher to store an event message when the subscriber of the event is not connected to the home network or is in sleep mode. The event publisher then can retransmit the event message to the subscriber when both are connected to the network at a later time.

In an embodiment of the present invention, an event subscriber registers its interest in delayable eventing. This is in addition to or in conjunction with requesting to subscribe to eventing itself. This may be accomplished by, for example, providing subscribers with a new header field called DELAY_ABLE for indicating the subscription to delayable eventing, as shown below:

```
SUBSCRIBE publisher path HTTP/1.1
  HOST: publisher host:publisher port
  USER-AGENT: OS/version UPnP/1.1 product/version
  CALLBACK: <delivery URL>
  NT: upnp:event
  TIMEOUT: Second-requested subscription duration
  DELAY_ABLE: DELAY_ABLE Delay-able eventing flag which
    indicates the Delay_able eventing mode will be turn
    on within the subscription duration
  DELAY_DURATION: Second- requested delay duration
```

As can be seen, the header field not only allows the subscriber to register an interest for delayable eventing, but also to indicate the duration that the delayable eventing will be in effect. Once this duration expires, delayable eventing is discontinued. The subscriber may, however, indicate a renewable to delayable eventing by sending another subscription message as follows:

```
SUBSCRIBE publisher path HTTP/1.1
  HOST: publisher host:publisher port
  SID: uuid: subscription UUID
  TIMEOUT: Second-requested subscription duration
  DELAY_ABLE: DELAY_ABLE Delay-able eventing
    flag which indicates the Delay_able eventing mode will
    be turn on within the subscription duration
  DELAY_DURATION: Second- requested delay duration
```

When an event occurs, the publisher sends an event message. If the event subscriber does not respond to the event message sent by the event publisher within 30 seconds, or if the event publisher is unable to connect to the subscriber's address, the publisher will abandon sending the message to the subscriber but will store the event message for later transmission and keep the subscription active if the subscriber has registered its interest in delayable eventing and the delay duration has not expired. Future events are handled in the same way. In one embodiment, stored events may be purged once the subscription (or delay duration) expires or once the subscription is cancelled.

In one embodiment of the present invention, when the connection between the event publisher and the event subscriber is re-established, or when the event subscriber awakens from "sleep" mode, the event subscriber sends a renewal message to the event publisher. Upon receiving the renewal message, the event publisher then retransmits previously stored event messages to the reconnected event subscriber. It should be noted that there are some cases where the cause of the disconnection between the event publisher and the event subscriber is due to the fact that the event publisher has become disconnected from the network, or otherwise cannot communicate (as opposed to being caused by the event subscriber). In such cases, the event publisher can automatically retransmit the stored events to the event subscriber(s) (i.e., without requiring that the event subscriber send a renewal message).

In one embodiment, the publisher maintains a list of all subscribers and a list of all variables to which the subscribers wish to receive events. In addition to this information, the publisher may also maintain, for each subscriber, a unique subscription identifier, a delivery address (e.g., Uniform Resource Locator), an event key, a subscription duration, a list of the web protocol (e.g., Hypertext Transfer Protocol) version supported by the subscriber.

In another embodiment, a proxy is utilized to manage the subscriptions, freeing the publisher from this task. Thus, in some embodiments, the subscription to delayable eventing is sent from the subscriber to the proxy rather than from the subscriber the publisher.

FIG. 1 is a flow diagram illustrating a method for monitoring events in a home network in accordance with an embodiment of the present invention. This method may be performed in a device in the home network that generates events that might be of interest to one or more control points in the home network.

At 100, a subscription request is received at a node from a control point, wherein the subscription indicates an interest in delayable eventing. The subscription request may include a header identifying that the request contains an interest in delayable eventing. The subscription request may also include a duration for the delayable eventing to remain in place. The node may be a home network device, or may be a proxy between the control point and a home network device. At 102, a change in a first event variable is detected. At 104, it is determined if the control point should receive an event notification regarding the change in the first event variable. If so, then at 106, the node sends the control point an event notification regarding the change in the first event variable. At 108, it is determined if the control point responds within 30 seconds from the subscription request. If so, then at 110, the node stores an event notification regarding the change in the first event variable such that the event notification can be retrieved when the control point can receive communications from the node. If the control point does respond within 30 seconds, then at 112, the node discards the event notification (or simply does not generate it in the first place).

The cause of a control point not being able to respond to the node can vary based on implementation. Common causes include disconnection of the control point or node from the home network, or the control point entering a "sleep mode."

At 114, communications is reestablished between the control point and the node. In response to this, at 116, the node sends the event notification regarding the change in the first event variable to the control point. There may be additional steps prior to this sending, as if it the loss of communications was caused by the control point, one implementation of the present invention requires that a renewal message be received from the control point prior to the node sending the event notification.

Figure 2:
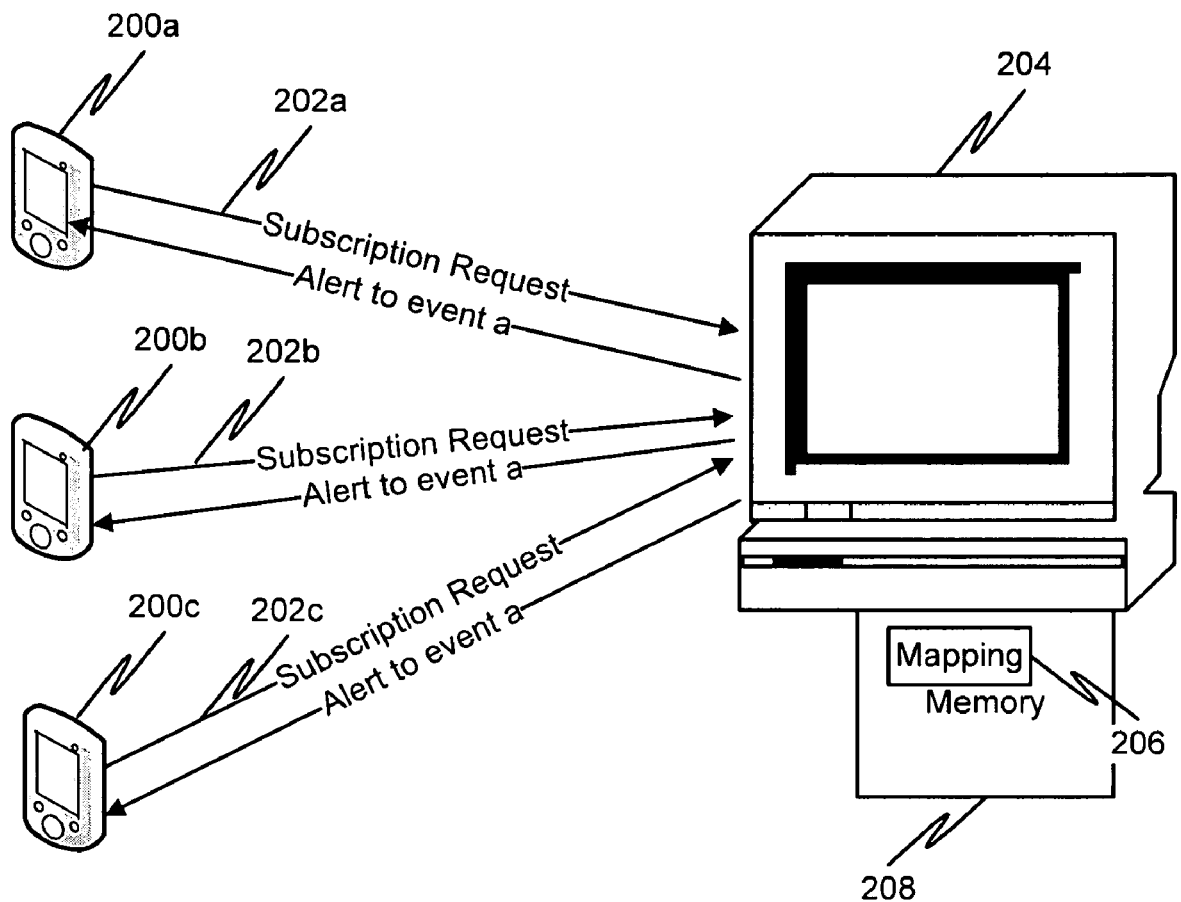
FIG. 2 is an architecture diagram illustrating a home network in accordance with another embodiment of the present invention.

FIG. 2 is an architecture diagram illustrating a home network in accordance with another embodiment of the present invention. This architecture does not include a proxy for the subscription and eventing control, and thus relies on individual devices to manage their own subscriptions. Thus, control points 200a-200c may each send subscription requests 202a-202c to device 204. Each of the requests 202a-202c may contain their indication of whether delayable eventing is desired. Device 204 then stores a mapping 206 in a memory 208, wherein the mapping indicates which control points 200a-200c want delayable eventing. When an event occurs, the device 204 then checks this mapping and then checks to see which control points should receive an event notification and whether the control points are in communication with the device.

It should be noted that the memory 208 in which the device 204 may or may not be located at the device. As long as the memory 208 is reachable via communication by the device 204, the memory 208 can be located anywhere. Nothing in this document shall be construed as in any way limiting the location of where the mapping 206 is stored.

In another embodiment, a centralized proxy is utilized as a repository that, in addition to keeping device information, can act as a subscription server and filter event messages for devices based upon the events the subscribers wish to receive. In other words, the proxy may be used to free up the home network device from the task of managing which subscribers receive which events. This reduces the burden on the device, as the device simply needs to send all event messages to the subscription server as it always had, and the subscription server takes the lead in determining whether to pass the events to subscribers and, if so, to which subscribers.

The proxy receives subscription messages from the control points and disseminates the event messages based on the state of the subscriptions.

Figure 3:
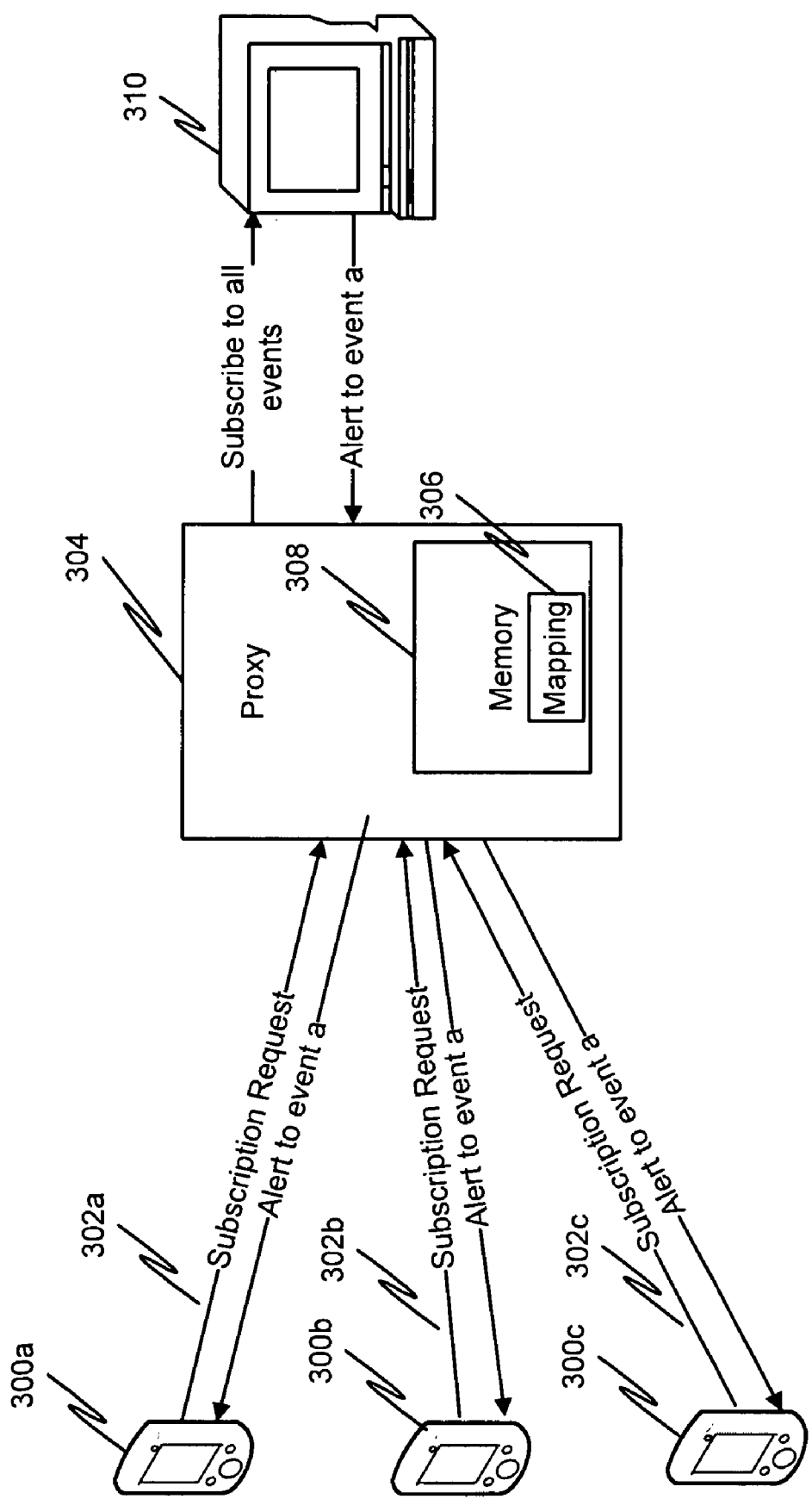
FIG. 3 is an architecture diagram illustrating a home network in accordance with another embodiment of the present invention.

FIG. 3 is an architecture diagram illustrating a home network in accordance with another embodiment of the present invention. This architecture includes a proxy for the subscription and eventing control, and thus frees up the individual devices from managing their subscriptions. Thus, control points 300a-300c may each send subscription requests 302a-302c to proxy 304. Each of the requests 302a-302c may contain their indication of whether delayable eventing is desired. Proxy 304 then stores a mapping 306 in a memory 408, wherein the mapping indicates which control points 300a-300c want to monitor which events. When an event occurs, the device 310 then simply sends an event notification to proxy 304. Proxy 304 checks the mapping and uses it to determine to which control points to send the event notification.

It should be noted that the memory 308 in which the proxy 304 may or may not be located at the proxy. As long as the memory 308 is reachable via communication by the proxy 304, the memory 308 can be located anywhere. Nothing in this document shall be construed as in any way limiting the location of where the mapping 406 is stored.

The present invention allows mobile devices that frequently disconnect and reconnect to a home network to take advantage of event notifications that they would otherwise miss. It also allows devices to enter sleep mode without the threat of missing event notifications, thus permitting these devices to save on power consumption.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for monitoring events in a home network, the method comprising:
   receiving, at a node on the home network, a subscription request from a control point on the home network, wherein the subscription request contains a variable that explicitly indicates whether or not the control point has an interest in delayable eventing;
   when an event variable changes, determining if the control point had indicated an interest in delayable eventing for the event variable in a subscription request sent from the control point, wherein the event variable changing indicates the addition or deletion of a file, and if so:
   determining if the control point can receive an event notification sent by the node;
   if the control point cannot receive the event sent by the node, storing an event notification regarding the change in the event variable such that the event notification can be retrieved when the control point can receive communications from the node; and
   sending the stored event notification regarding the change in the event variable to the control point when the control point can receive the notification.

2. The method of claim 1, further comprising:
   determining if the control point should receive an event notification regarding the change in the event variable.

3. The method of claim 1, wherein the node is a home network device.

4. The method of claim 1, wherein the node is a proxy between the control point and a home network device.

5. The method of claim 1, wherein the subscription request further contains a duration for delayable eventing and the storing only occurs if the duration has not been exceeded.

6. The method of claim 5, further comprising:
   receiving a renewing subscription request form the control point after the duration has expired, wherein the renewing subscription request contains a second duration, wherein the storing occurs if the second duration has not been exceeded.

7. The method of claim 1, wherein a control point cannot receive communications from the node if the control point has been disconnected from the home network.

8. The method of claim 7, wherein, upon reconnection of the node to the home network, the node sends the event notification regarding the change in the event variable.

9. The method of claim 1, wherein a control point cannot receive communications from the node if the control point has entered a "sleep" mode.

10. The method of claim 1, wherein the control point cannot receive communications from the node if the node has been disconnected from the home network.

11. The method of claim 1, wherein the subscription request indicates whether or not the control point has an interest in delayable eventing though the use of a dedicated field in a header of a subscription request to indicate delayable eventing interest.

12. A method for monitoring events in a home network, the method comprising:
receiving, at a node, a subscription request from a control point, wherein the subscription request contains a variable that explicitly indicates whether or not the control point has an interest in delayable eventing;
when an event variable changes, determining if the control point had indicated an interest in delayable eventing for the event variable in a subscription request sent from the control point, and if so:
determining if the control point can receive an event notification sent by the node;
if the control point cannot receive the event sent by the node, storing an event notification regarding the change in the event variable such that the event notification can be retrieved when the control point can receive communications from the node; and
sending the stored event notification regarding the change in the event variable to the control point when the control point can receive the notification;
wherein a control point cannot receive communications from the node if the control point has been disconnected from the home network and wherein, upon reconnection of the control point to the home network, the node receives a renewal message from the control point, and wherein the node, in response to the renewal message, sends the event notification regarding the change in the event variable.

13. A method for monitoring events in a home network, the method comprising:
receiving, at a node, a subscription request from a control point, wherein the subscription request contains a variable that explicitly indicates whether or not the control point has an interest in delayable eventing;
when an event variable changes, determining if the control point had indicated an interest in delayable eventing for the event variable in a subscription request sent from the control point, and if so:
determining if the control point can receive an event notification sent by the node;
if the control point cannot receive the event sent by the node, storing an event notification regarding the change in the event variable such that the event notification can be retrieved when the control point can receive communications from the node; and
sending the stored event notification regarding the change in the event variable to the control point when the control point can receive the notification;
wherein a control point cannot receive communications from the node if the control point has been disconnected from the home network and wherein, upon awakening of the control point from "sleep" mode, the node receives a renewal message from the control point, and wherein the node, in response to the renewal message, sends the event notification regarding the change in the event variable.

14. A system for monitoring events in a home network, the system comprising:
one or more control points on the home network;
a hardware node device on the home network configured to:
receive, at the node device, a subscription request from a control point, wherein the subscription request contains a variable that explicitly indicates whether or not the control point has an interest in delayable eventing;
when an event variable changes, determine if the control point had indicated an interest in delayable eventing for the event variable in a subscription request sent from the control point, wherein the event variable changing indicates the addition or deletion of a file, and if so:
determine if the control point can receive an event notification sent by the node device; and
if the control point cannot receive the event sent by the node device, store an event notification regarding the change in the event variable such that the event notification can be retrieved when the control point can receive communications from the node; and
send the stored event notification regarding the change in the event variable to the control point when the control point can receive the notification.

15. The system of claim 14, wherein the node device is a home network device.

16. The system of claim 14, wherein the node device is a proxy between the control point and a home network device.

17. A non-transitory program storage device readable by a machine tangibly embodying a program of instructions executable by the machine to perform a method for monitoring events in a home network, the method comprising:
receiving, at a node on the home network, a subscription request from a control point on the home network, wherein the subscription request contains a variable that explicitly indicates whether or not the control point has an interest in delayable eventing;
when an event variable changes, determining if the control point had indicated an interest in delayable eventing for the event variable in a subscription request sent from the control point, wherein the event variable changing indicates the addition or deletion of a file, and if so:
determining if the control point can receive an event notification sent by the node;
if the control point cannot receive the event sent by the node, storing an event notification regarding the change in the event variable such that the event notification can be retrieved when the control point can receive communications from the node; and
sending the stored event notification regarding the change in the event variable to the control point when the control point can receive the notification.

* * * * *